(12) United States Patent
Hur et al.

(10) Patent No.: US 9,778,506 B2
(45) Date of Patent: Oct. 3, 2017

(54) LIGHTING DEVICE WITH ENHANCED OPTICAL PROPERTIES AND LIQUID CRYSTAL DISPLAY DEVICE HAVING THE LIGHTING DEVICE

(75) Inventors: Sic Hur, Seoul (KR); Byoung Eon Lee, Seoul (KR); Sun Ho Yeo, Seoul (KR); Moo Ryong Park, Seoul (KR); Kwang Ho Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 158 days.

(21) Appl. No.: 14/342,135

(22) PCT Filed: Aug. 31, 2012

(86) PCT No.: PCT/KR2012/006993
§ 371 (c)(1),
(2), (4) Date: Feb. 28, 2014

(87) PCT Pub. No.: WO2013/032274
PCT Pub. Date: Mar. 7, 2013

(65) Prior Publication Data
US 2014/0218659 A1   Aug. 7, 2014

(30) Foreign Application Priority Data

Aug. 31, 2011 (KR) .................... 10-2011-0087502
Feb. 21, 2012 (KR) .................... 10-2012-0017287

(51) Int. Cl.
*G02F 1/13357* (2006.01)
*G02F 1/1335* (2006.01)

(52) U.S. Cl.
CPC .. *G02F 1/133603* (2013.01); *G02F 1/133606* (2013.01)

(58) Field of Classification Search
CPC ................. G02F 1/133603; G02F 1/133606
See application file for complete search history.

(56) References Cited

U.S. PATENT DOCUMENTS

| 2002/0198279 A1* | 12/2002 | Ha ................ C08F 290/14 522/7 |
| 2010/0265694 A1* | 10/2010 | Kim ................ G02F 1/133602 362/97.1 |
| 2010/0302477 A1* | 12/2010 | Ohmi ................ G02B 6/0078 349/62 |
| 2011/0012942 A1* | 1/2011 | Kim ................ G02B 6/0016 345/690 |

(Continued)

FOREIGN PATENT DOCUMENTS

| JP | 2006-236701 A | 9/2006 |
| JP | 2006-236771 A | 9/2006 |

(Continued)

OTHER PUBLICATIONS

International Search Report in International Application No. PCT/KR2012/006993 filed Aug. 31, 2012.

*Primary Examiner* — Sophie Hon
(74) *Attorney, Agent, or Firm* — Saliwanchik, Lloyd & Eisenschenk

(57) ABSTRACT

Provided is a lighting device comprising: a plurality of top view type LED light sources which are formed on a base substrate; and a resin layer which embeds the plurality of LED light sources and is laminated on the base substrate.

11 Claims, 3 Drawing Sheets

(56) References Cited

U.S. PATENT DOCUMENTS

2011/0051397 A1* 3/2011 Bae .................. G02F 1/133603
362/97.1
2011/0051412 A1* 3/2011 Jeong ................ G02F 1/133603
362/235
2011/0249215 A1* 10/2011 Jung ................. G02F 1/133603
349/61

FOREIGN PATENT DOCUMENTS

JP      2007-155791 A     6/2007
KR      10-2011-0045636 A  5/2011

* cited by examiner

PRIOR ART

LIGHTING DEVICE WITH ENHANCED OPTICAL PROPERTIES AND LIQUID CRYSTAL DISPLAY DEVICE HAVING THE LIGHTING DEVICE

CROSS-REFERENCE TO RELATED APPLICATIONS

This application is the U.S. national stage application of International Patent Application No. PCT/KR2012/006993, filed Aug. 31, 2012, which claims priority to Korean Application Nos. 10-2011-0087502, filed Aug. 31, 2011, and 10-2012-0017287, filed Feb. 21, 2012, the disclosures of each of which are incorporated herein by reference in their entirety.

TECHNICAL FIELD

This application claims priority to Korean Patent Application No. 10-2011-0087502, filed on Aug. 31, 2011, No. 10-2012-0017287, filed on Feb. 21, 2012, in the Korean Intellectual Property Office, the entire contents of which are hereby incorporated by reference.

The present invention relates to a lighting device using an LED as a light source and, more particularly, to a backlight unit, a liquid crystal display device, and a lamp device for vehicles using the lighting device.

BACKGROUND ART

A lighting device which implements lighting by guiding light emitting from a light source has been variously required for a lamp for lighting, a lamp for vehicles, a liquid crystal display device and the like. In the lighting device, a technology for making the structure of equipment thin and a structure capable of improving the efficiency of light have been recognized as the most important technologies.

Hereinafter, as one example to which the lighting device is applied, a liquid crystal display device will be explained.

Referring to FIG. 1, a lighting device 1 is configured such that a flat light guide plate 30 is disposed on a substrate 20, and a plurality of side-view type LEDs 10 (only one being illustrated) are disposed on a side surface of the light guide plate 30 in an array shape. Light L incident to the light guide plate from the LEDs 10 is reflected upward by a fine reflection pattern or a reflection sheet 40 provided to a bottom surface of the light guide plate 30 and is radiated from the light guide plate 30. Then, the light is provided to an LCD panel 50 of an upper part of the light guide plate 30.

As illustrated in FIG. 2, the lighting device may be formed in a structure in which a diffuse sheet 31 or a plurality of optical sheets such as prism sheets 32, 33, a protective sheet 34 and the like are further added between the light guide plate 30 and the LCD panel 50.

Accordingly, the light guide plate is basically used as an essential component of the lighting device, but due to a thickness of the light guide plate, there is a limitation to make a thickness of a whole product thin. In the case of a large-sized lighting device, it is problematic that image quality is deteriorated.

DISCLOSURE OF INVENTION

Technical Problem

The present invention has been made keeping in mind the above problems occurring in the prior art, and an aspect of the present invention provides a lighting device which is capable of reducing the number of LEDs, securing optical properties, and realizing local dimming by mounting top view type LEDs are mounted in a direct type, and which is capable of innovatively reducing a thickness of the lighting device by using a resin layer instead of a light guide plate.

Solution to Problem

According to an aspect of the present invention, there is provided a lighting device comprising: a plurality of top view type LED light sources which are formed on a base substrate; and a resin layer which embeds the LED light sources and is laminated on the base substrate. In particular, an optical pattern layer is implemented on the resin layer to prevent light from being concentrated. Furthermore, a reflective film or a reflective unit is implemented on the base substrate so that reflection efficiency can be improved, and a diffusion plate and an air layer are implemented so that the diffusion and disperse effects of light can be improved.

Advantageous Effects of Invention

In accordance with an exemplary embodiment of the present invention, it is advantageous that the number of LEDs can be reduced, optical properties can be secured, and local dimming can be realized by mounting the top view type LEDs in a direct type, and a thickness of the lighting device can be innovatively reduced by using the resin layer instead of the light guide plate.

In accordance with another exemplary embodiment of the present invention, it is advantageous that an optical pattern layer having an optical pattern is formed, a perforated pattern is formed on white PET, and a light shielding pattern is provided, thereby being capable of removing hot spots and a dark space generated in an upper part of the LED light sources, implementing the lighting device without the significant difference of optical properties while securing reliability between an adhesive material and bonded parts, and enabling the parts to be accurately aligned.

Furthermore, it is advantageous that an air gap module having the air layer formed by patterning or using a separate member is installed on the diffusion plate, thereby increasing optical properties such as the diffusion of alighting device and the uniformity of light.

In particular, the reflective film having the reflective pattern, and the diffusion plate having the air layer are provided to the resin layer, so it is effective to secure stable light emitting properties.

BRIEF DESCRIPTION OF DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

BEST MODE FOR CARRYING OUT THE INVENTION

Figure 1:
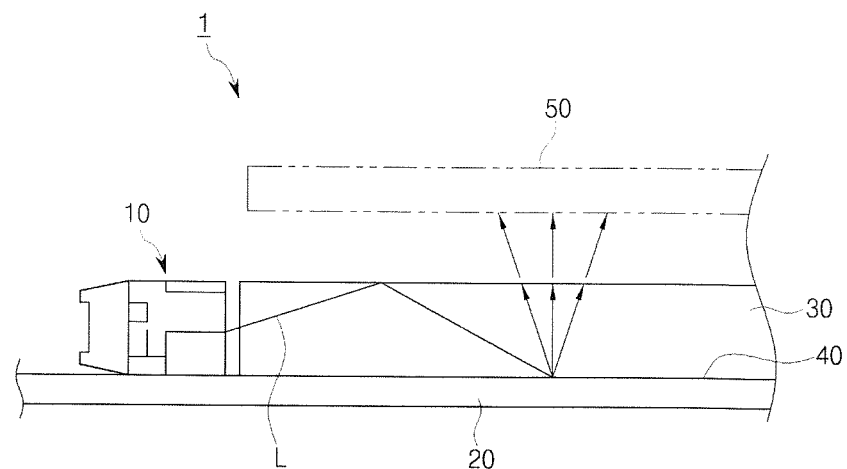
FIG. 1 and FIG. 2 are concept views illustrating the structure of a conventional lighting device.
Figure 2:
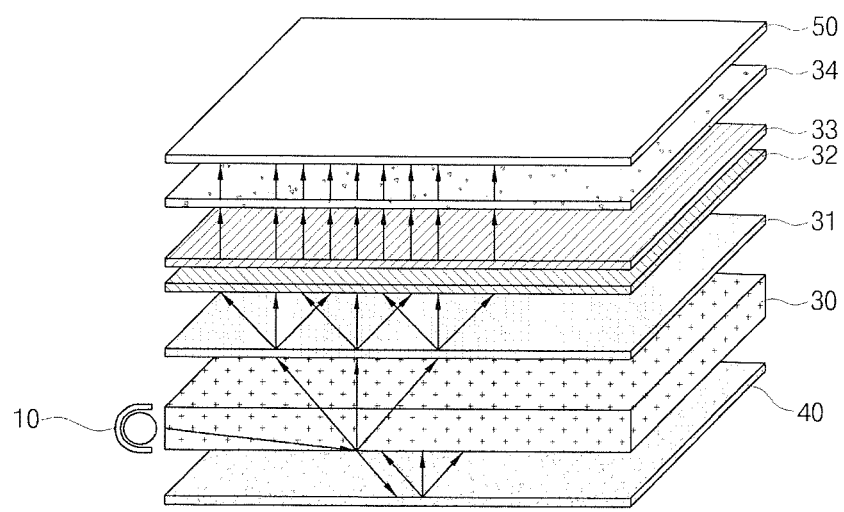

Exemplary embodiments according to the present invention will now be described more fully hereinafter with reference to the accompanying drawings. In the explanation with reference to the accompanying drawings, regardless of reference numerals of the drawings, like numbers refer to like elements through the specification, and repeated explanation thereon is omitted. Terms such as a first term and a second term may be used for explaining various constitutive elements, but the constitutive elements should not be limited to these terms. These terms is used only for the purpose for distinguishing a constitutive element from other constitutive element The gist of the present invention is to provide a technology in which a light guide plate is removed from the structure of a used lighting device to use a resin layer, top view type LEDs are used as a light source, and an optical pattern layer is installed so that light is not concentrated on an upper part of the resin layer.

The lighting device according to the present invention is not limited to being applied to a backlight unit of a liquid crystal display. That is, the lighting device may be applied to various lamp devices which need lighting, namely, a lamp for vehicles, a home lighting device, and an industrial lighting device. In the lamp for vehicles, it may be also applied to a headlight, indoor illumination, a back light and the like.

1. First Exemplary Embodiment

Figure 3:
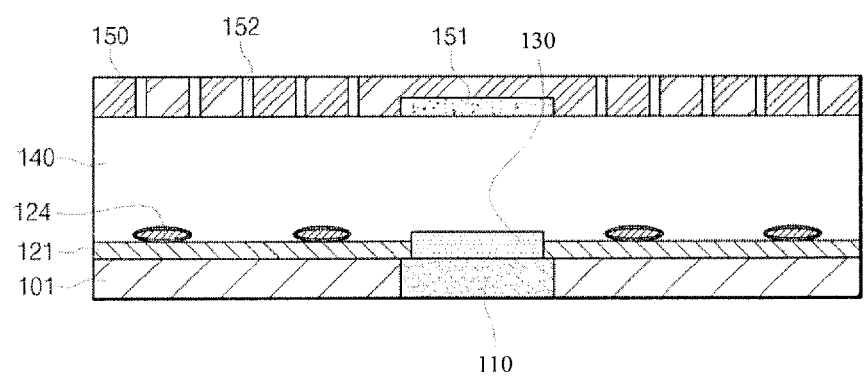
FIG. 3 is a cross-sectional concept view illustrating the subject matter of a lighting device according to an embodiment of the present invention.
Figure 4:
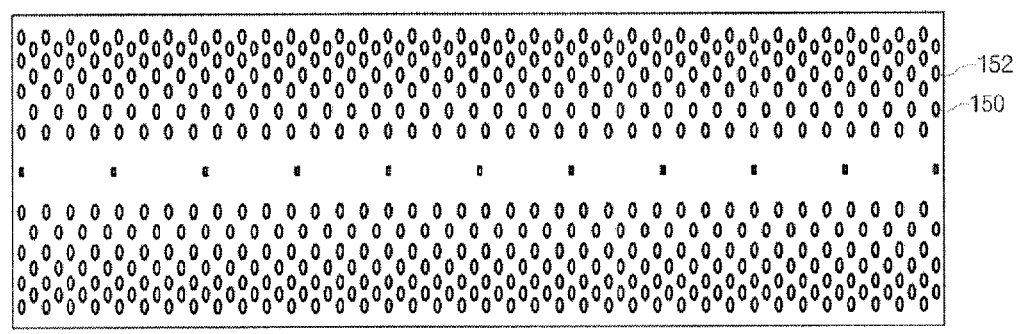
FIG. 4 is a plane view illustrating the structure of an optical pattern layer according to another embodiment of the present invention.

FIG. 3 is a concept view illustrating the structure of a lighting device according to an exemplary embodiment of the present invention.

Referring to FIG. 3, the lighting device according to the present exemplary embodiment of the invention may be configured to include: a plurality of top view type LED light sources 130 which are formed on a base substrate 101; and a resin layer 140 which embeds the LED light sources and is laminated on the base substrate.

In particular, in the illustrated structure, the top view type LED light sources 130 according to the present exemplary embodiment of the invention may radiate light in an upper direction, and may be formed in a structure in which the plurality of top view type LED light sources are mounted on a printed circuit board 110 in a bar type. Of course, in this case, the printed circuit board 110 in the bar type may be also configured such that the plurality of printed circuit boards in the bar type are disposed on the base substrate 101.

In the illustrated structure, the printed circuit board 110 may be embedded in the base substrate 101, and may be disposed in a structure in which the LED light sources 130 are protruded, but being not limited to this. The printed circuit board may be also disposed on a surface of the base substrate 101.

The resin layer 140 may be applied to an upper surface of the base substrate 101. The resin layer may be laminated in a structure which embeds the LED light sources 130 and may function to guide the light emitted from the LED light sources in the upper direction. That is, the resin layer may function to disperse the light at the LED light sources 130. That is, the resin layer 140 may perform the function of a conventional light guide plate.

The resin layer 140 may use an optical adhesive. As one example of the optical adhesive, an ultraviolet curable resin to which an oligomer and a monomer are connected may be used. In this case, the oligomer may be any one selected from urethane acrylate, epoxy acrylate, polyester acrylate, and acrylic acrylate. Here, mono-functional, di-functional, tri-functional and multi-functional monomers may be used as the monomer. For example, the resin layer according to the present exemplary embodiment of the invention may basically use all resins composed of a material which is able to diffuse light. For example, a main material of the resin layer as one example according the present invention may use resins having a urethane acrylate oligomer as its main material. That is, a mixture of the urethane acrylate oligomer, which is a synthesis oligomer, and a polymer type which is polyacrylic may be used. Of course, a monomer in which IBOA (isobornyl acrylate), HPA (Hydroxylpropyl acrylate, 2-HEA (2-hydroxyethyl acrylate) which are a diluted reactive monomer having a low boiling point are mixed may be further included therein. Furthermore, as additives, a photoinitiator (i.e. 1-hydroxycyclohexyl phenylketone and the like) or an antioxidant may be mixed. Moreover, the resin layer may include a bead to increase the diffusion and reflection of light. The bead may be included in a range of 0.01 to 0.3 wt % to a total weight of the resin layer. That is, the light radiated from the LED light sources may be diffused and reflected through the resin layer 140 and the bead to travel in the upper direction. Thanks to the presence of the resin layer, because a thickness occupied by the conventional light guide plate may be innovatively reduced, a whole product may be made to be thin. In addition, the product may have ductile quality, thereby having generality which can be applied to a flexible display device.

The bead may formed of any one selected from silicon, silica, glass bubble, PMMA (poly methyl meth acrylate), urethane, Zn, Zr, $Al_2O_3$, acryl and may have a particle size between 1 μm and 20 μm.

Furthermore, an optical pattern layer 150 may be installed in an upper part of the resin layer 140, and thus may function to prevent the light radiated from the LED light sources 130 from being concentrated.

In the illustrated structure, the optical pattern layer as a preferred exemplary embodiment according to the present invention may be formed of white PET (polyethylene terephthalate) and may be formed in a structure in which a plurality of through holes 152 are patterned on the white PET, thereby preventing hot spots caused by the concentration of light, and uniformly forming dark lines. Of course, in this case, a metal material instead of the through holes may be printed and implemented on the white PET. Furthermore, in addition to the structure in which the through holes are installed on white PET, a structure in which an optical pattern 151 to shield light is printed may be used.

In addition to the example in which the optical pattern layer is implemented using the white PET, as another example, the optical pattern layer may be provided in a structure in which the optical pattern 151 is printed on a general polymer film (i.e. PET). The optical pattern 151 may prevent a hot spot phenomenon from being generated by partially shielding concentration of the light radiated from the LED light sources 130. That is, the optical pattern 151 may be implemented to adjust the shield level or diffusivity of light using one optical pattern so that the optical pattern can perform the function to partially shield and diffuse the light rather than the function to completely shield the light. Furthermore, more preferably, the optical pattern according to the present exemplary embodiment of the invention may be implemented in an overlapping printing structure of a composite pattern. The overlapping printing structure is called a structure which is implemented by forming one pattern and printing another one patter shape on its upper part.

As one example, the optical pattern 151 may be implemented in an overlapping printing structure of a diffusion pattern, which is formed on a lower surface of a polymer film in a light radiating direction by using a light shielding ink including at least one material selected from $TiO_2$, $CaCO_3$, $BaSO_4$, $Al_2O_3$, Silicon, ZnO, Al, and Ag, and a light shielding pattern using the light shielding ink including a mixture material of Al, or Al and $TiO_2$. That is, the optical pattern may be formed by white-printing the diffusion pattern on a surface of the polymer film, and thereafter forming the light shielding pattern thereon, or in an opposite order to this, the optical pattern may be formed in a double structure. Of course, it would be obvious that a formation design of the pattern may be variously modified based on light efficiency and intensity, and a light shielding ratio. In addition, the optical pattern may be formed in a triple structure wherein in a sequential laminated structure, the light shielding pattern which is a metal pattern is formed on a middle layer, and the diffusion patterns are implemented in its upper part and lower part, respectively. In this triple structure, the optical pattern may be implemented by selecting the aforesaid materials. As one preferred example, the efficiency and uniformity of light may be secured by the triple structure which is configured such that one of the diffusion patterns may be implemented using $TiO_2$ having excellent reflectance, other diffusion pattern may be implemented using $CaCO_3$ and $TiO_2$ together having excellent light stability and color sense, the light shielding pattern may be implemented using Al having excellent hiding properties. In particular, $CaCO_3$ may function to finally implement white light through the function to reduce the exposure of yellow light, thereby being capable of achieving the light having more stable efficiency. In addition to $CaCO_3$, inorganic materials such as $BaSO_4$, $Al_2O_3$, Silicon beads having a large particle size and a similar structure may be utilized. Moreover, in view of the light efficiency, it would be preferable that the optical pattern is formed by adjusting a pattern density so that the pattern density is reduced as the optical pattern moves away from the light radiating direction of the LED light source.

Furthermore, like the structure illustrated in FIG. 3, the lighting device according to the present exemplary embodiment of the invention may further include a first reflective film 121 which is laminated on a surface of the base film. The first reflective film may apply an Ag film or a white PET film.

2. Second Exemplary Embodiment

The present exemplary embodiment of the invention may be implemented in a structure in which an air layer is formed by unitizing the structure of the reflective film in the structure of the first exemplary embodiment.

Figure 5:
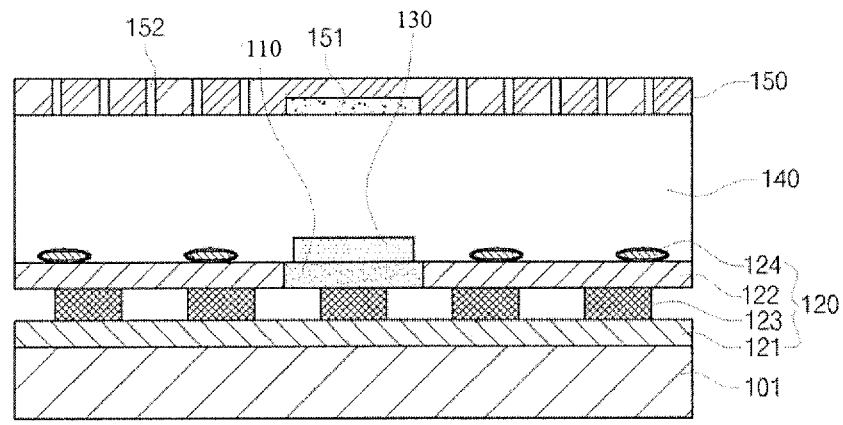
FIG. 5 and FIG. 6 are cross-sectional concept views illustrating the structure of a light device according to the still another of the present invention.

That is, like the structure illustrated in FIG. 5, a reflective unit 120 may be formed in structure in which an air area is implemented between the base substrate 101 and the resin layer 140 in a structure which is laminated on the base film 101.

The reflective unit 120 may include: the first reflective film 121 which is closely adhered to a surface of the base substrate 101; and a second reflective film 122 which is spaced apart from the first reflective film 121 to form a first air area A1 and is made of a transparent material. The first and second reflective films 121 and 122 may be laminated on the base substrate.

The first air area A1 may be formed in a structure in which the first and second reflective films 121 and 122 are integrally compressed without using a member such as a separate adhesive. Furthermore, as illustrated, the first air area A1 in which air is received through a space member 123 such as a separate adhesive member may be implemented in such a manner that the first and second reflective films 121 and 122 are spaced apart from each other.

In this case, the first reflective film 121 may use a reflective material which reflects light, namely, a film in which a metal layer of Ag and the like is formed. The second reflective film 122 may use a film made of a transparent material so that the light radiated from the LED light sources is transmitted on a surface of the first reflective film and is again reflected. In particular, in addition to that the light radiated from the LED light sources 130 transmits the first reflective film and is again reflected at the second reflective film, a reflective pattern 124 may be installed on a surface of the second reflective film 122 through white printing, so the dispersion of the light can be more promoted, thereby being capable of improving luminance. The reflective unit 120 may implement the effect capable of maximizing the luminance of light. The reflective pattern may be printed using a reflective ink including any one of $TiO_2$, $CaCO_3$, $BaSO_4$, $Al_2O_3$, Silicon, and PS.

3. Third Exemplary Embodiment

Figure 6:
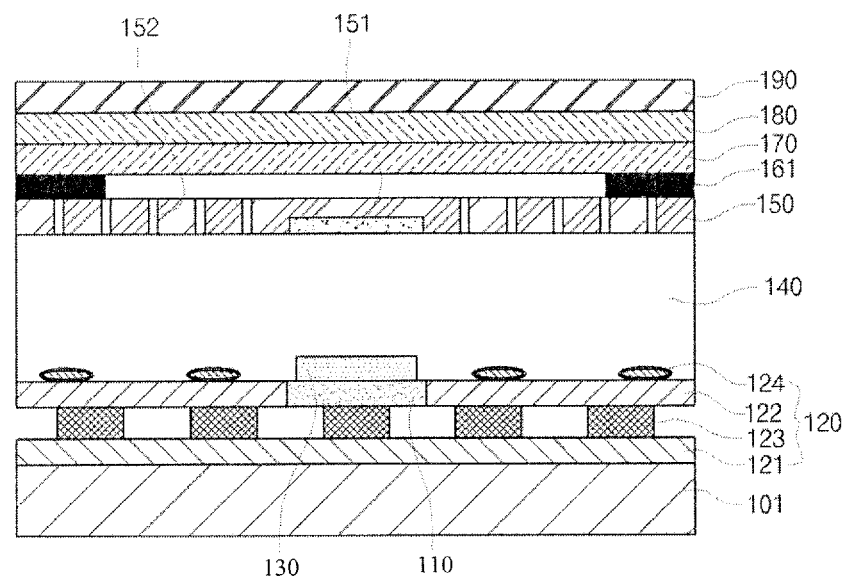

FIG. 6 illustrates a structure in which a diffusion plate 170 is further included on the optical pattern layer 150 in addition to the structure of the first and second exemplary embodiments.

That is, as illustrated in FIG. 6, as the third exemplary embodiment, the lighting device may be implemented to further include a second air area disposed between the optical pattern layer 150 and the diffusion plate 170. That is, to the configuration of the lighting device according to the present invention, a structure in which the air layer (the second air area 160) is installed between the optical pattern layer 150 and the diffusion plate 170 may be added. Thanks to the presence of the second air area 161, it is advantageous that the light radiated from the LED light sources can be diffused and uniformity of the light can be improved. Moreover, to minimize a deviation of the light which transmits the resin layer 140 and the optical pattern layer 150, the second air area may have a thickness of 0.01 to 2 mm.

The second air area 160 may be formed by implementing a structure in which the air layer may be formed in a lower part of the diffusion plate. The third air area may include a method of implementing the air area (air layer) by processing the diffusion plate itself or a configuration wherein the air area is formed by forming a separate construction in the lower part of the diffusion plate.

The lighting device according to the present invention may be applied to the following LCD.

Explaining it with reference to FIG. 6, the light is radiated from the top view type LED light sources 130 in an upper direction. The radiated light is reflected and diffused at the resin layer 140 formed instead of the conventional light guide plate. Instead of preventing the light from being concentrated using the optical pattern layer 150 for preventing the excessive concentration of light, thanks to the diffusion effect of beads included between the resin layers, the luminance of light may be more improved.

Moreover, the radiated and reflected light moves in a direction of the diffusion plate 170. In this case, the concentration of light may be prevented by the optical pattern layer 150, and the deviation of light can be minimized by the second air area 160 formed in the lower part of the diffusion plate.

In particular, thanks to the presence of the reflective unit 120 according to the present exemplary embodiment of the invention disposed between the resin layer 140 and the printed circuit board 110, reflectance can be more improved, the efficiency of light can be maximized, and the improvement of luminance may be implemented. In particular, in the case of reflective unit 120 according to the present exemplary embodiment of the invention. The control of reflectance may be implemented by varying a design which implements the air area by patterning an adhesive material layer. According to the raw material and kind of a patterned adhesive material, the implementation of other reflectance and colors can be adjusted. Furthermore, according to a light characteristic and a thickness of the second reflective film 122, reflectance may be adjusted.

Like this, the light passing through the resin layer 140 is diffused or shielded through the optical pattern 151 formed on the optical pattern layer 150, and an optical characteristic of the refined light is refined once again through the third air area formed in the lower part of the diffusion plate, thereby being capable of increasing uniformity. The light is incident to an LCD panel as white light through an optical sheet such as a prism sheet 180, DBEF 190 and the like which will be added later.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. A lighting device, comprising:
a base substrate;
a LED light source of a top view type disposed on the base substrate;
a resin layer embedding the LED light source and laminated on the base substrate;
a first reflective film disposed between the resin layer and the base substrate;
a reflective pattern disposed between the resin layer and the first reflective film; and
an optical pattern layer disposed on the resin layer;
wherein the optical pattern layer comprises an optical pattern and a plurality of through holes,
wherein the optical pattern layer covers an upper portion and lateral sides of the optical pattern,
wherein a bottom portion of the optical pattern and a bottom portion of the optical pattern layer are on a same plane,
wherein the plurality of through holes exposes parts of the resin layer by penetrating the optical pattern layer,
wherein each of the plurality of through holes is extended from an upper surface of the optical pattern layer to a lower surface of the optical pattern layer,
wherein the plurality of through holes is spaced apart from the optical pattern on a same plane, and
wherein the optical pattern layer comprises polyethylene terephthalate (PET);
the lighting device further comprising a reflective unit between the base substrate and the resin layer comprising:
a second reflective film which is spaced apart from the first reflective film by an adhesive pattern material to form a first air area and includes a transparent material,
wherein the first reflective film comprises a metal layer.

2. The lighting device of claim 1, wherein the LED light source is disposed on a printed circuit board and
wherein the LED light source overlaps the optical pattern in a vertical direction.

3. The lighting device of claim 2, wherein the printed circuit board is disposed in a structure in which at least two printed circuit boards are laminated on the base substrate or the printed circuit board is embedded in the base substrate.

4. The lighting device of claim 1, wherein the optical pattern is disposed on an upper surface of the resin layer and shields light, and
wherein the upper surface of the resin layer is in contact with the bottom portion of the optical pattern and the bottom portion of the optical pattern layer.

5. The lighting device of claim 1, wherein the resin layer is an ultraviolet curing resin including an oligomer.

6. The lighting device of claim 5, wherein the oligomer is any one selected from urethane acrylate, epoxy acrylate, polyester acrylate, and acrylic acrylate.

7. The lighting device of claim 5, wherein the resin layer further comprises beads formed of any one selected from silicon, silica, glass bubble, PMMA (poly methyl meth acrylate), urethane, Zn, Zr, $Al_2O_3$, and acryl.

8. The lighting device of claim 1, wherein the first reflective film is an Ag film or a white PET film.

9. The lighting device of claim 1, wherein the second reflective film is adhered to the resin layer, and the reflective pattern is disposed on a surface of the second reflective film.

10. The lighting device of claim 1, wherein the reflective pattern is printed and patterned by a reflective ink including one of $TiO_2$, $CaCO_3$, $BaSO_4$, $Al_2O_3$, Silicon, and PS.

11. The lighting device of claim 1, further comprising a diffusion plate on the optical pattern layer,
a second air area implemented between the optical pattern layer and the diffusion plate,
a prism sheet on the diffusion plate, and
a Double Bright Enhancement Film (DBEF) on the prism sheet,
wherein the second air area has a thickness in a range of 0.01 mm to 2 mm.

* * * * *